(12) United States Patent
Yan et al.

(10) Patent No.: US 10,596,931 B2
(45) Date of Patent: Mar. 24, 2020

(54) CAR SAFETY SEAT

(71) Applicant: Wonderland Switzerland AG, Steinhausen (CH)

(72) Inventors: Fengxiang Yan, Guangdong (CN); Yen-Lin Lee, Steinhausen (CH)

(73) Assignee: Wonderland Switzerland AG, Steinhausen (CH)

( * ) Notice: Subject to any disclaimer, the term of this patent is extended or adjusted under 35 U.S.C. 154(b) by 0 days.

(21) Appl. No.: 15/979,475

(22) Filed: May 15, 2018

(65) Prior Publication Data

US 2018/0334068 A1 Nov. 22, 2018

(30) Foreign Application Priority Data

May 18, 2017 (CN) .......................... 2017 1 0352642

(51) Int. Cl.
*B60N 2/28* (2006.01)
*B60N 2/56* (2006.01)
*B60N 2/58* (2006.01)

(52) U.S. Cl.
CPC .............. *B60N 2/2881* (2013.01); *B60N 2/56* (2013.01); *B60N 2/58* (2013.01)

(58) Field of Classification Search
CPC ........ A47C 7/742; B60N 2/2881; B60N 2/26; B60N 2/56; B60N 2/5607; B60N 2/58
USPC .............. 297/452.46, 219.12, 228.13, 250.1, 297/452.47
See application file for complete search history.

(56) References Cited

U.S. PATENT DOCUMENTS

| | | | | |
|---|---|---|---|---|
| 2,931,427 | A * | 4/1960 | Goldstein | A47C 7/16 297/452.43 |
| 4,556,254 | A * | 12/1985 | Roberts | A47C 7/40 297/452.36 |
| 2004/0090099 | A1* | 5/2004 | Chen | B29C 44/1214 297/250.1 |

FOREIGN PATENT DOCUMENTS

| | | | |
|---|---|---|---|
| CN | 205395824 U | 7/2016 | |
| DE | 9209227 U1 * | 9/1992 | ............. A47C 7/742 |
| DE | 42 20 685 A1 | 1/1994 | |
| EP | 1 728 676 A2 | 12/2006 | |

* cited by examiner

*Primary Examiner* — Milton Nelson, Jr.
(74) *Attorney, Agent, or Firm* — Winston Hsu

(57) ABSTRACT

A car safety seat is disclosed in the invention, including a main body and a flexible layer. Multiple air vents are formed on the main body and penetrate through the main body along a front-to-rear direction. The flexible layer is formed on a surface of the main body and in the air vents. The multiple air vents enable vapor to pass through the main body without being blocked by the main body during a foaming process, which thereby allows foaming particles to fully contact with the vapor to ensure an enhanced foaming effect. Also, the flexible layer is not only formed on the surface of the main body but also formed in the air vents to fill the air vents, and thereby the flexible layer is more tightly combined with the main body to reduce a risk of detachment from the main body.

6 Claims, 3 Drawing Sheets

CAR SAFETY SEAT

BACKGROUND OF THE INVENTION

1. Field of the Invention

The invention relates to a car safety seat, and more particularly, to a car safety seat including a main body tightly combined with a flexible layer.

2. Description of the Prior Art

A car safety seat (i.e. a child safety seat) is a safety apparatus necessary for protecting a child during a car ride. A conventional manufacturing method of the car safety seat is to shape a main body of the car safety seat first and then to dispose a seat pad or a cushion onto the main body. The main body is often formed from thermoplastics, such as polypropylene (PP), injected into an injection mold via an injection molding procedure, where a hardness of the formed main body necessitates an addition of the seat pad or the cushion equipped with the main body to enhance comfort and safety thereof for the child to be seated in. However, for fixing the seat pad or the cushion to the main body, correspondent fixing structures need to be disposed thereon, which leads to a problem of increased cost and increased work-hour of assembly.

To solve the above-mentioned problem, the Chinese patent application with publication number CN101731880A provides a manufacturing method for a car safety seat, where a flexible layer is directly formed on the main body by a foaming process instead of adding an additional seat pad or cushion onto the main body. The conventional foaming process includes steps of disposing the main body of the car safety seat into a mold, injecting thermoplastic foam material (such as expanded polypropylene, EPP) after closing the mold to form the flexible layer covering the main body, demolding the mold after cooling the foamed flexible layer, drying and cooling the main body and the flexible layer attached thereon, and deburring the car safety seat.

The operational principle of the above-mentioned foaming process is as follows: after the foam material is injected into the mold, a vapor with high temperature is injected into the mold to provide an environment of particular temperature and pressure for enabling foaming particles to foam so as to be combined onto the main body to become the flexible layer. However, in an actual manufacturing process, the vapor is often blocked by the main body in the mold and cannot develop a full contact with some of the foaming particles, which affects the foaming quality and the formed quality of the flexible layer, leading to a poor bonding strength between the flexible layer and the main body. Besides, the main body also lacks fixing structures for fixing the flexible layer, which results in a risk of detachment of the flexible layer from the main body.

SUMMARY OF THE INVENTION

Therefore, the objective of the invention is to provide a car safety seat including a main body tightly combined with a flexible layer.

To achieve the aforementioned objective, the invention provides a car safety seat including a main body and a flexible layer. A plurality of air vents penetrating through the main body along a front-to-rear direction of the main body are formed on the main body. A flexible layer is formed on a surface of the main body and in the plurality of air vents.

Preferably, a hole diameter of a front end of each of the plurality of air vents is larger than a hole diameter of a rear end of each of the plurality of air vents.

Preferably, a hole diameter of each of the plurality of air vents is gradually decreasing from the front end of each of the plurality of air vents to the rear end of each of the plurality of air vents.

Preferably, the main body includes a supporting portion and an edge rib surrounding and fixed to the supporting portion. The plurality of air vents are formed on the edge rib.

Preferably, a plurality of engaging portions are protruded from the edge rib. The flexible layer covers the plurality of engaging portions.

Preferably, a free end of each of the plurality of engaging portions is bent in a hook shape.

Preferably, a plurality of engaging portions are protruded from the main body. The flexible layer covers the plurality of engaging portions.

Preferably, the flexible layer is made of foam material.

In summary, the plurality of air vents formed on the main body of the invention enable vapor to pass through the air vents without being blocked by the main body during a foaming process, which thereby allows foaming particles to fully contact with the vapor to ensure an enhanced foaming effect. Also, the flexible layer is not only formed on a surface of the main body but also formed in the plurality of air vents to fill the air vents, and thereby the flexible layer is tightly combined with the main body to reduce a risk of detachment from the main body.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. Accordingly, the drawings and descriptions will be regarded as illustrative in nature and not as restrictive.

Figure 1:
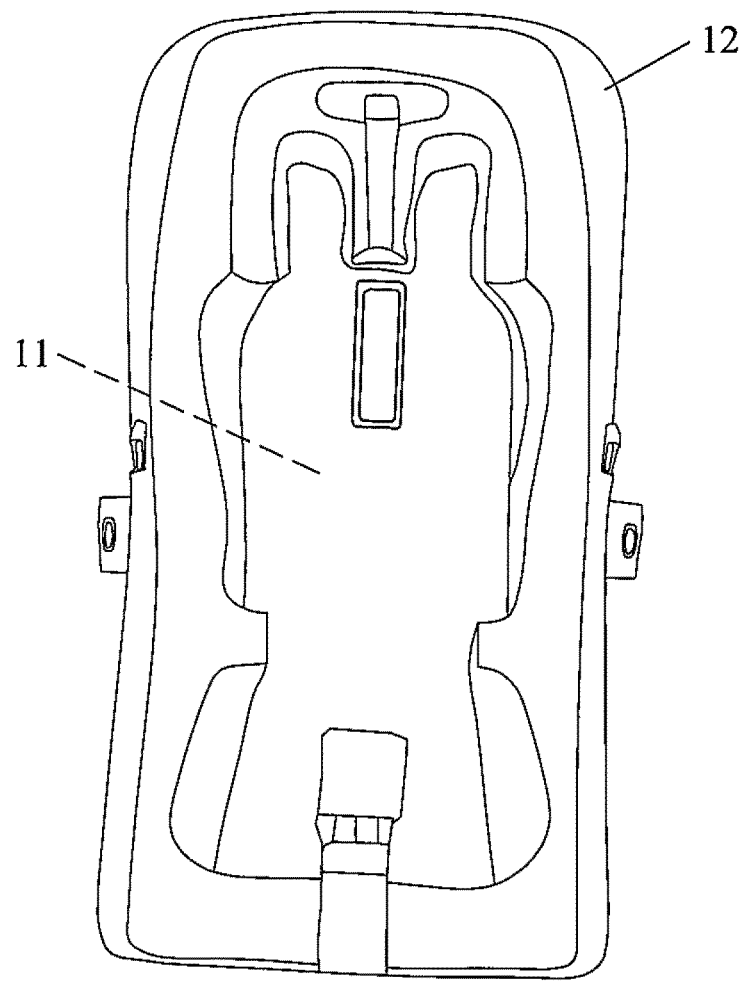
FIG. 1 is a diagram of a main body of a car safety seat according to an embodiment of the present application.

Please refer to FIG. 1. FIG. 1 is a diagram of a main body 11 of a car safety seat 1 according to an embodiment of the present application. The car safety seat 1 saving the necessity to install a seat pad or a cushion is provided by the present application. The car safety seat 1 includes the main body 11 and a flexible layer 12. The main body 11 is formed individually before being put into a mold. The flexible layer 12 is formed on a surface of the main body 11 through a foaming process, and the formed flexible layer 12 adheres to and thoroughly covers the main body 11. A hardness of the flexible layer 12 is lower than a hardness of the main body 11, which provides comfort and safety for a child to be seated in the car safety seat 1.

Figure 2:
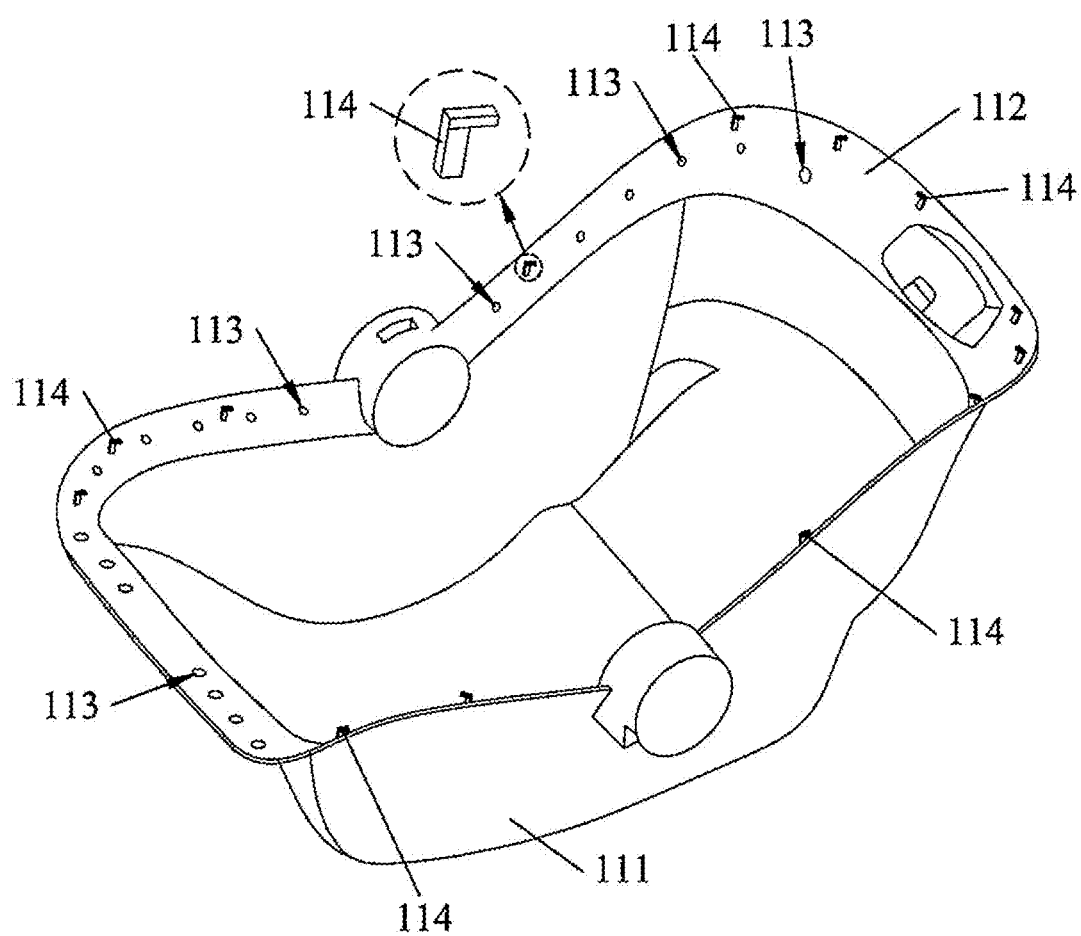
FIG. 2 is a perspective diagram of the car safety seat according to the embodiment of the present application.
Figure 3:
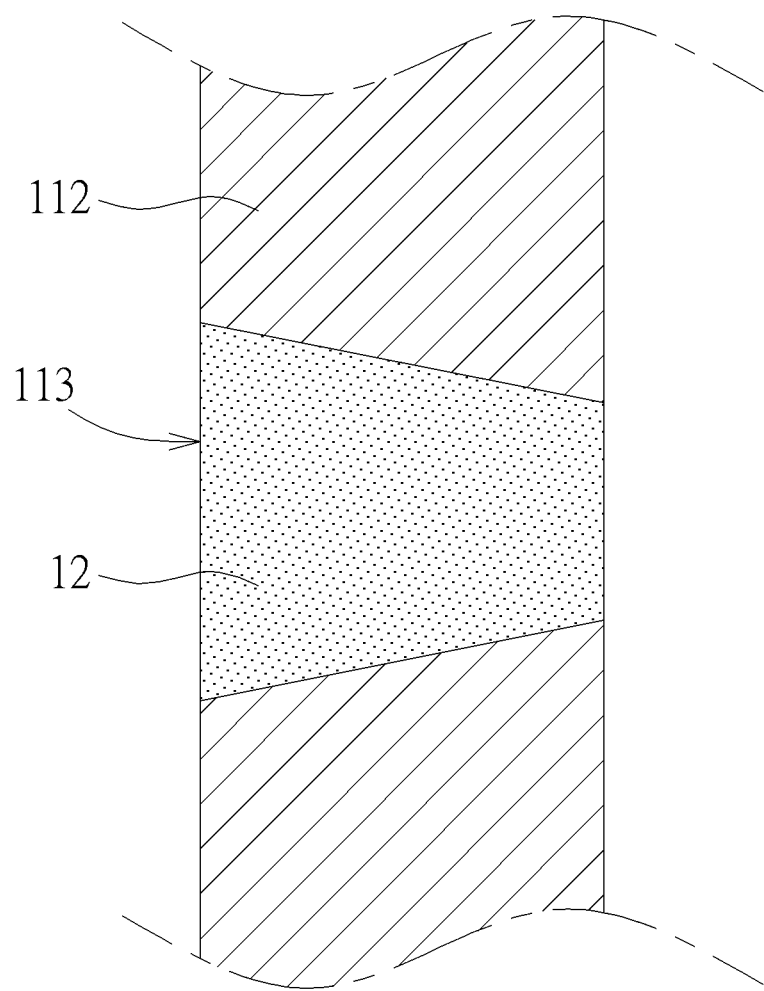
FIG. 3 is a diagram of an air vent on the main body according to the embodiment of the present application.

Please refer to FIG. 1 and FIG. 2. FIG. 2 is a perspective diagram of the car safety seat 1 according to the embodiment of the present application. The main body 11 can be formed from polypropylene (PP) in an injection mold through an injection molding procedure. The main body 11 includes a supporting portion 111 and an edge rib 112 surrounding and fixed to an edge of the supporting portion 111. The supporting portion 111 encloses a space in the middle of the supporting portion 111 mainly for the child to be seated in. The edge rib 112 extends outwardly relative to a peripheral wall of the supporting portion 111. A side which the infant child faces when being seated in the main body 11 is defined as a front side of the main body 11, and a side opposite to the front side is defined as a rear side of the main body 11. A plurality of air vents 113 are formed on the edge rib 112 of the main body 11 and penetrates through the main body 11 along a front-to-rear direction of the main body 11. The air vents 113 can be compactly or loosely distributed around the edge rib 112 or be located on a specific section of the edge rib 112. The air vents 113 can be exemplified by, but not limited to, circular holes, elliptic holes, square holes, or holes of any shape which penetrate through the edge rib 112 along the front-to-rear direction. The air vents 113 can be exemplified by holes with a constant hole diameter. Furthermore, the air vent 113 of the embodiment also can be exemplified as having a hole diameter at a front end larger than a hole diameter at a rear end. Please refer to FIG. 3. FIG. 3 is a diagram of the air vent 113 on the main body 11 according to the embodiment of the present application. Preferably, a hole diameter can be gradually decreasing from the front end to the rear end. The air vents 113 can be directly formed by complementary protruding structures in a cavity of the mold during a shaping process of the main body 11 or formed by drilling after finishing the shaping process of the main body 11.

Please refer to FIG. 2. A plurality of engaging portions 114 protrude from the edge rib 112 and the engaging portions 114 can be located closer to an edge of the edge rib 112 than the air vents 113. A free end of each of the engaging portions 114 can be bent in a hook shape, while the shape of the engaging portion is not limited to the embodiment and can further be exemplified as a cylinder or an inverted circular pedestal. A size of the free end of each of the engaging portions 114 can be larger than a size of a fixed end of each of the engaging portions 114 to enhance an engaging effect.

Please refer to FIG. 1 and FIG. 2. The flexible layer 12 can be made of foam material, such as expanded polypropylene (EPP), and formed to cover the surface of the main body 11 and the engaging portions 114 on the main body 11. The foam material can also enter into the air vents 113 to form the flexible layer 12 in the air vents 113. Compared with a conventional car safety seat, the flexible layer 12 is more tightly combined with the main body 11 by being formed in the air vents 113 and covering the engaging portions 114. The front side of the main body 11 is a primary site of shaping during a foaming process, and tight combination between the flexible layer 12 and the main body 11 can be achieved not only by the structural design of the air vents 113 having a front end diameter larger than a rear end diameter but also by bending the free end of the engaging portion 114 in a hook shape, as described above. Besides, the air vents 113 enable the vapor in the mold to pass through the main body 11 without being blocked by the main body 11 during the foaming process, which thereby allows foaming particles to fully make contact with the vapor and to foam thoroughly. Therefore, the quality of the formed flexible layer 12 is ensured.

In other embodiments of the present application, the air vents 113 and the engaging portions 114 can be disposed on the supporting portion 111 of the main body 11 instead of being disposed on the edge rib 112, and even the engaging portions 114 can be omitted when only the air vents 113 are disposed. It should be noticed that the aforementioned configurations are also capable of facilitating the tight combination between the flexible layer 12 and the main body 11.

In contrast to the prior art, the air vents 113 formed on the main body 11 of the present application enable the vapor to pass through the air vents 113 without being blocked by the main body 11 during a foaming process, which thereby allows foaming particles to fully contact with the vapor to ensure an enhanced foaming effect. Also, the flexible layer 12 can be not only formed on the surface of the main body 11 but also formed in the plurality of air vents 113 to fill the air vents 113, and thereby the flexible layer 12 is tightly combined with the main body 11 to reduce a risk of detachment from the main body 11.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A car safety seat comprising:
   a main body, a plurality of air vents being formed on the main body and penetrating through the main body along a front-to-rear direction of the main body, wherein a hole diameter of a front end of each of the plurality of air vents is larger than a hole diameter of a rear end of each of the plurality of air vents, and the main body comprising:
      a supporting portion; and
      an edge rib surrounding and fixed to the supporting portion, the plurality of air vents being formed on the edge rib; and
   a flexible layer formed on a surface of the main body and in the plurality of air vents.

2. The car safety seat claim 1, wherein a plurality of engaging portions are protruded from the main body, and the flexible layer covers the plurality of engaging portions.

3. The car safety seat of claim 1, wherein a hole diameter of each of the plurality of air vents is gradually decreasing from the front end of each of the plurality of air vents to the rear end of each of the plurality of air vents.

4. The car safety seat of claim 1, wherein the flexible layer is made of foam material.

5. The car safety seat of claim 1, wherein a plurality of engaging portions are protruded from the edge rib, and the flexible layer covers the plurality of engaging portions.

6. The car safety seat of claim 5, wherein a free end of each of the plurality of engaging portions is bent in a hook shape.

* * * * *